Figure 1:
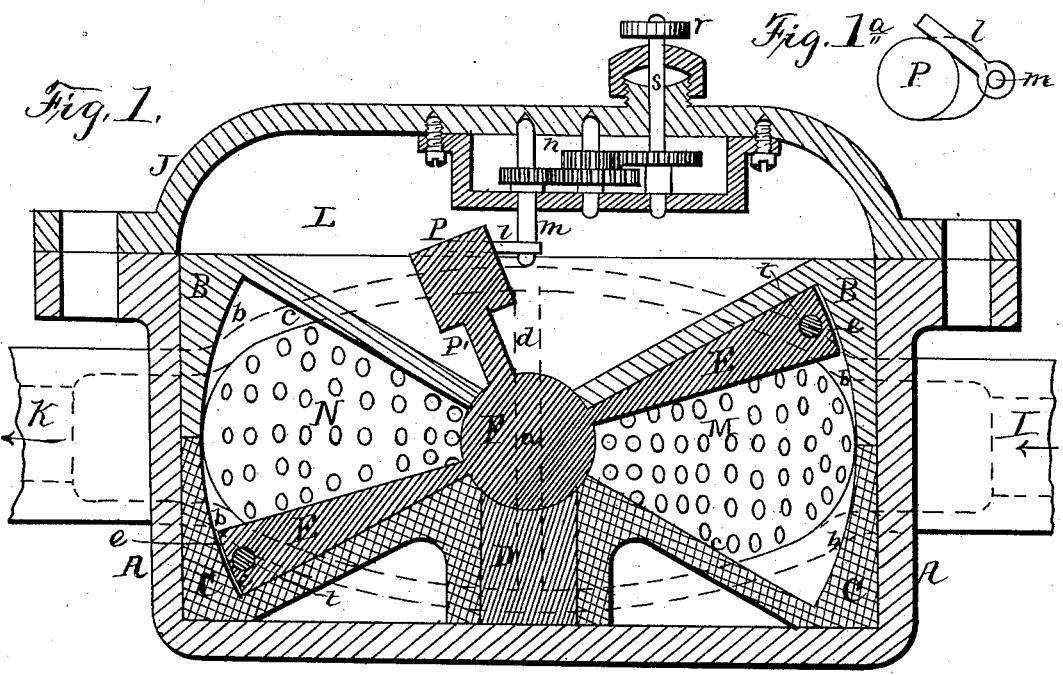

(No Model.) 9 Sheets—Sheet 1.

L. H. NASH.
WATER METER WITH NUTATING PISTON.

No. 379,805. Patented Mar. 20, 1888.

Fig. 1ª.

Witnesses.
Ella S. Johnson.
Wm. R. Mackville.

Inventor.
Lewis Hallock Nash.
By his Attorneys,
Johnson & Johnson.

(No Model.) 9 Sheets—Sheet 2.
L. H. NASH.
WATER METER WITH NUTATING PISTON.
No. 379,805. Patented Mar. 20, 1888.

Witnesses,
Ella S. Johnson,
Wm. R. Mackrille.

Inventor,
Lewis Hallock Nash
By his Attorneys
Johnson & Johnson (No Model.) 9 Sheets—Sheet 3.

L. H. NASH.
WATER METER WITH NUTATING PISTON.

No. 379,805. Patented Mar. 20, 1888.

Witnesses,
Ella S. Johnson
Wm R Mackrille

Inventor,
Lewis Hallock Nash
By his Attorneys
Johnson & Johnson (No Model.) 9 Sheets—Sheet 4.

L. H. NASH.
WATER METER WITH NUTATING PISTON.

No. 379,805. Patented Mar. 20, 1888.

Witnesses:
Ella S. Johnson,
W. H. Mackrille.

Inventor.
Lewis Hallock Nash
By his Attorneys
Johnson and Johnson (No Model.) 9 Sheets—Sheet 5.
L. H. NASH.
WATER METER WITH NUTATING PISTON.
No. 379,805. Patented Mar. 20, 1888.
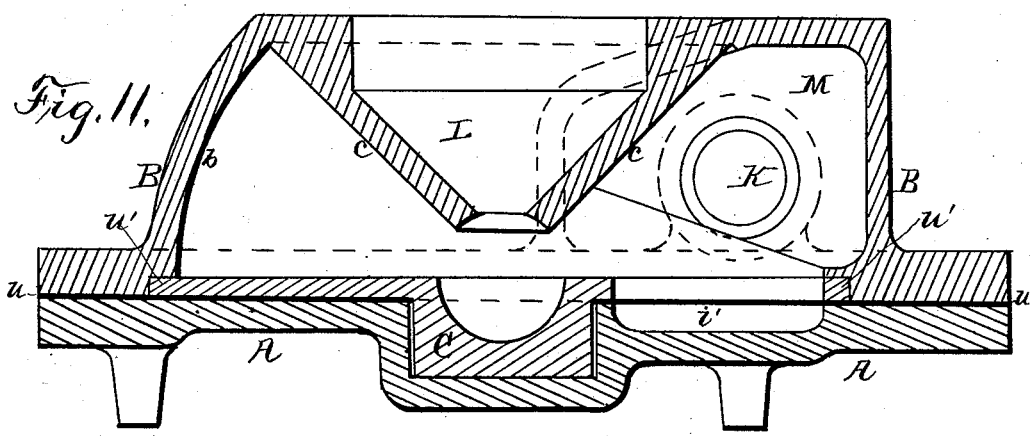
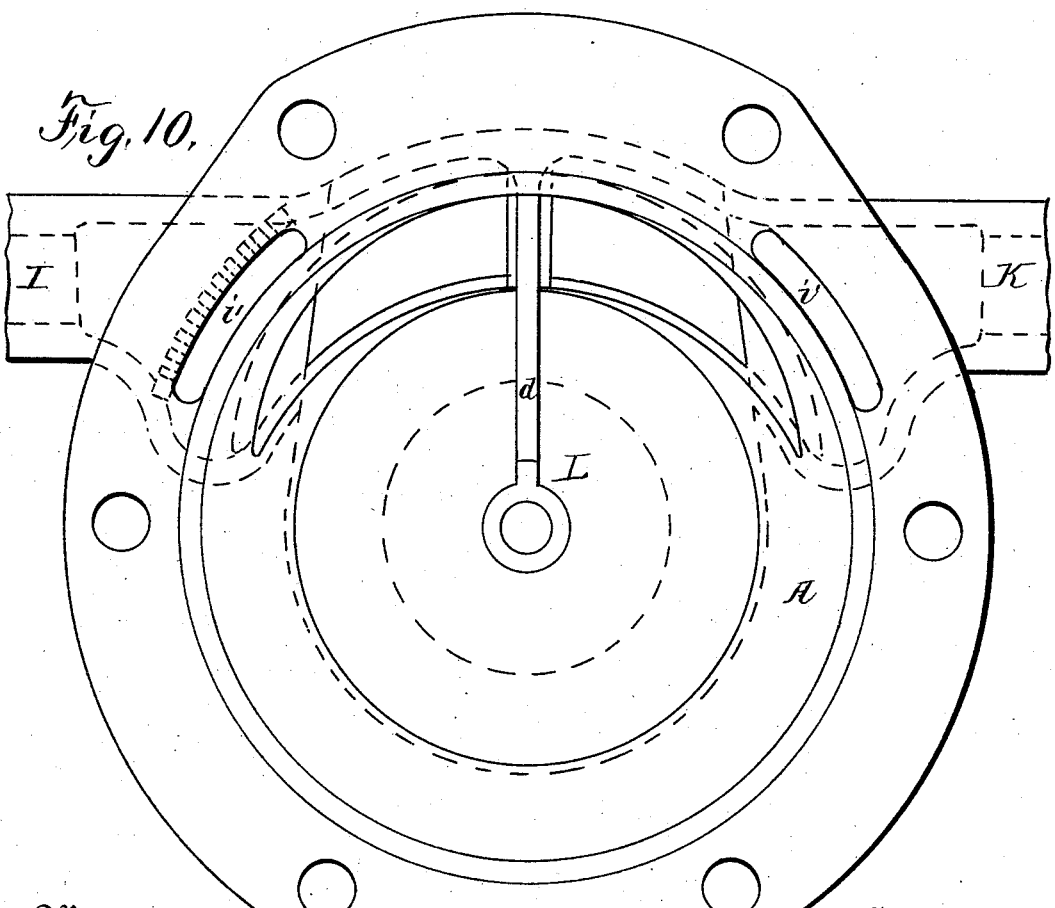
Witnesses
Ella S. Johnson.
Wm. F. Mackrille.
Inventor,
Lewis Hallock Nash
By his Attorneys
Johnson & Johnson (No Model.) 9 Sheets—Sheet 6.
L. H. NASH.
WATER METER WITH NUTATING PISTON.
No. 379,805. Patented Mar. 20, 1888.
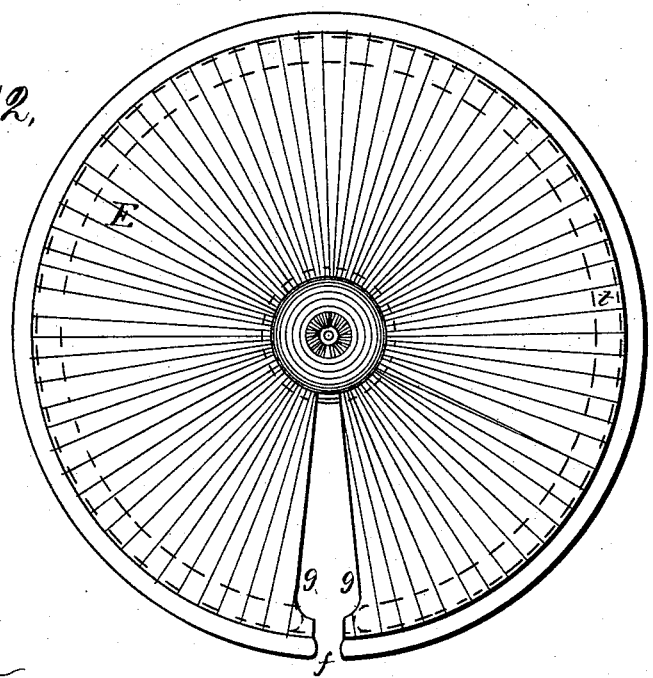
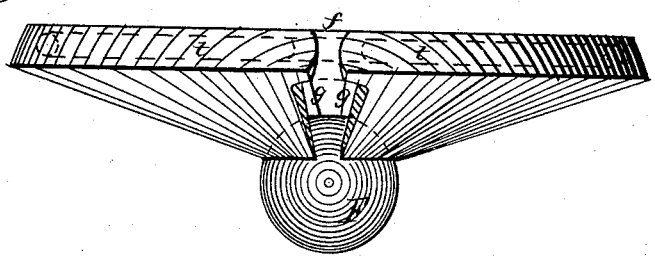
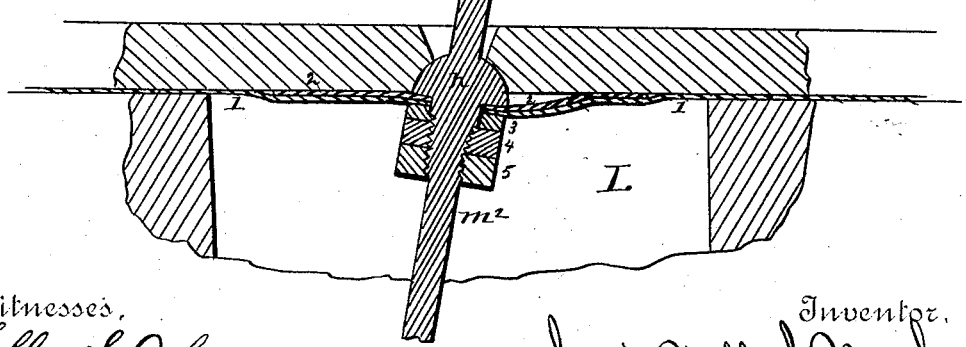

(No Model.) 9 Sheets—Sheet 7.
L. H. NASH.
WATER METER WITH NUTATING PISTON.

No. 379,805. Patented Mar. 20, 1888.

(No Model.) 9 Sheets—Sheet 8.
L. H. NASH.
WATER METER WITH NUTATING PISTON.
No. 379,805. Patented Mar. 20, 1888.
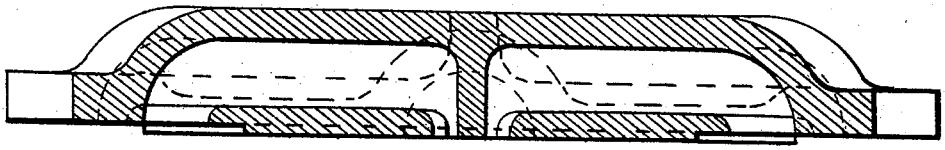
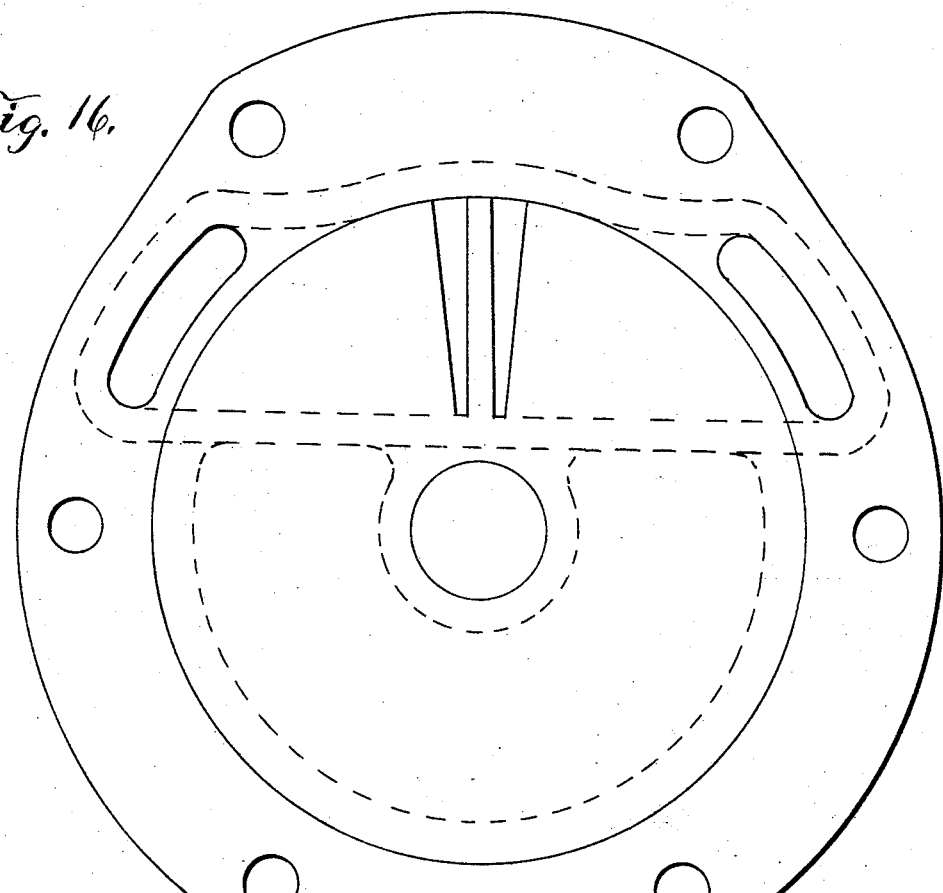
Witnesses.
Ella S. Johnson.
Thos. R. Mackrille.
Inventor,
Lewis Hallock Nash
By his Attorneys
Johnson & Johnson (No Model.) 9 Sheets—Sheet 9.

L. H. NASH.
WATER METER WITH NUTATING PISTON.

No. 379,805. Patented Mar. 20, 1888.

Witnesses,
Ella S. Johnson,
Wm. R. Mackrille.

Inventor.
Lewis Hallock Nash.
By his Attorneys,
Johnson & Johnson

UNITED STATES PATENT OFFICE.

LEWIS HALLOCK NASH, OF BROOKLYN, ASSIGNOR TO THE NATIONAL METER COMPANY, OF NEW YORK, N. Y.

WATER-METER WITH NUTATING PISTON.

SPECIFICATION forming part of Letters Patent No. 379,805, dated March 20, 1888.

Application filed February 12, 1887. Serial No. 227,406. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters with Nutating Pistons, of which the following is a specification.

My invention consists of improvements in that class of water-meters in which a piston has a motion of nutation, substantially as hereinafter described. In this class of meters the piston is substantially of the form of a cone or a disk and operates to divide a measuring-chamber of a form bounded by surfaces corresponding to those of the piston. The piston has a motion within the case such that its axis of revolution describes a cone or a tapering figure, regular or irregular. The motion of the piston, which is substantially herein described and illustrated, I call a "motion of nutation," which term is used to denote the general characteristics of the movements of said piston. The piston, instead of being of the form of a plain cone or disk, may be corrugated or otherwise varied, and the measuring-chamber may be similarly corrugated or otherwise adapted to correspond to the contacting-surfaces of the piston. Neither is it necessary that the piston be made round, as shown, since it is obvious that it may be of various shapes if the measuring-chamber be made of corresponding form.

My invention is directed to such a construction, organization, and adaptation of the various features of such a device as will fit it to become an accurate, durable, and cheap water-meter; and to this end my invention is directed, among other things, to providing for a free-moving piston which shall offer little resistance to the water, said piston being controlled in its movement by the flow of the water without mechanical connection with the case; to provide such a connection of said piston with a registering apparatus as not to place any restriction upon the piston's movement, so that the piston may lift away from the bearing-faces, if necessary, to pass over foreign substances which may be carried into the measuring-chamber; to provide a register-connecting mechanism which shall so move with such ease as not to retard the free movement of the piston; to so construct and arrange the entrance and escape passages to the measuring-spaces as will relieve the piston from all pressure due to jets of water and swift-flowing currents, and to prevent all suction by so forming the ports that there shall be ample opening into the measuring-spaces in all positions of the piston; to adapt the piston to constantly maintain its proper joint-forming function without rigid mechanical connections; to provide such a construction of the piston, measuring-chamber, and meter-case as will be most economical of manufacture, and the use of materials in construction which will be the most durable and the most easy to make of the form required, and to secure such a poise of the piston as will permit it to move with the least possible friction and wear. The novel features of my improved meter will be particularly designated in the claims concluding this specification.

It will be understood that I do not limit my improvements to the exact form of devices shown in my drawings, but that they will apply to any form of case and piston having a motion substantially similar and operating in a manner substantially similar to divide the inclosing-chamber into measuring-spaces.

Figure 2:
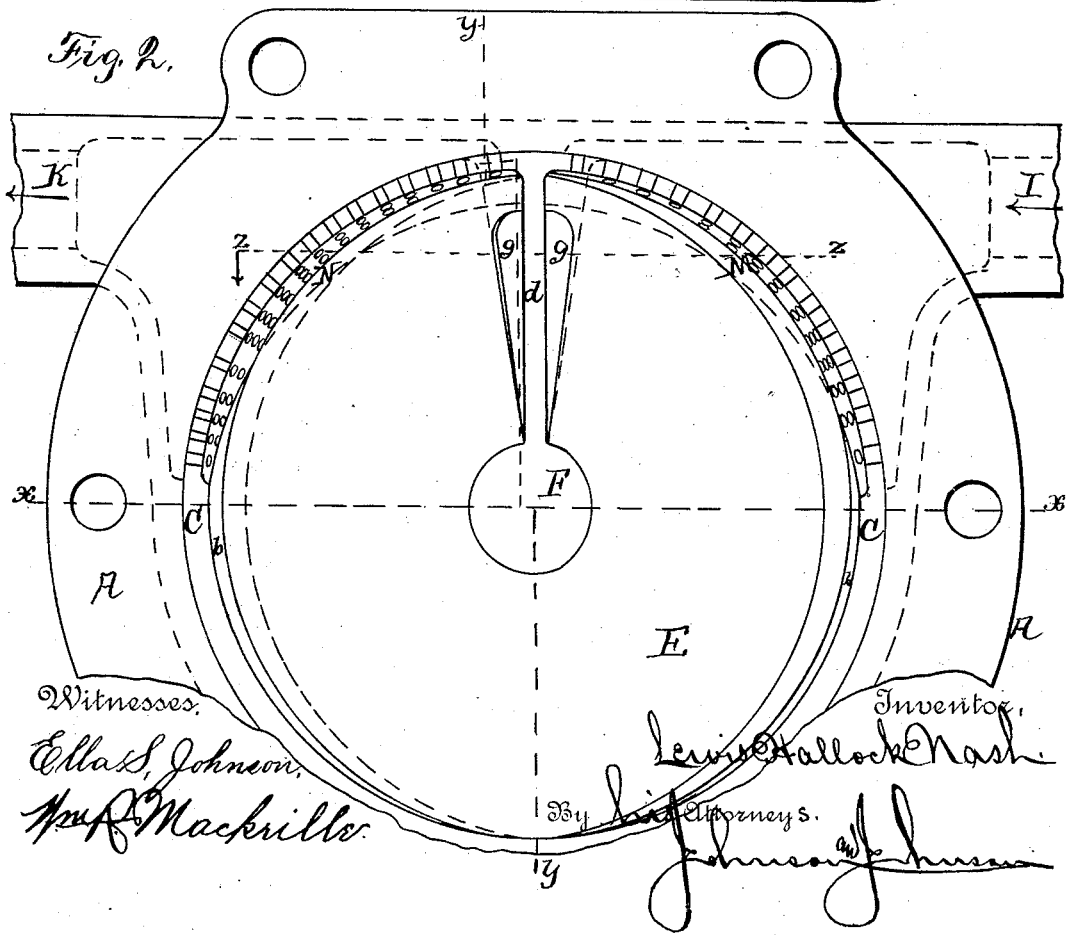
Figure 4:
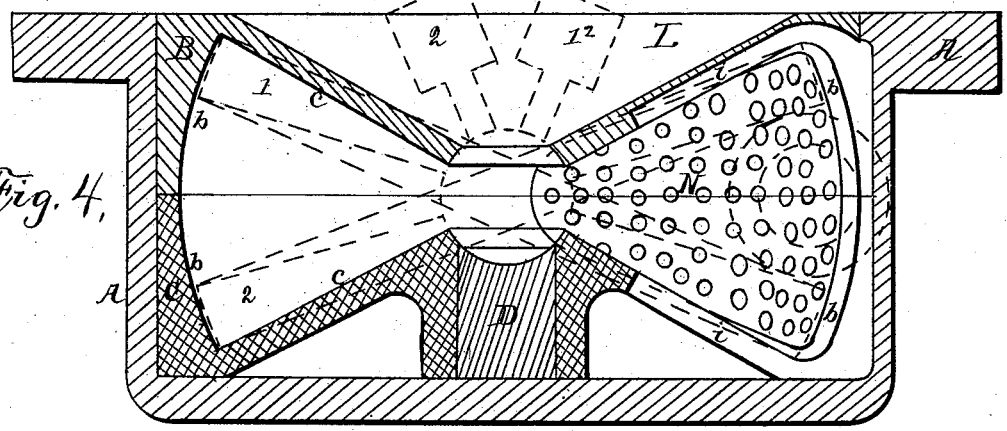
Figure 3:
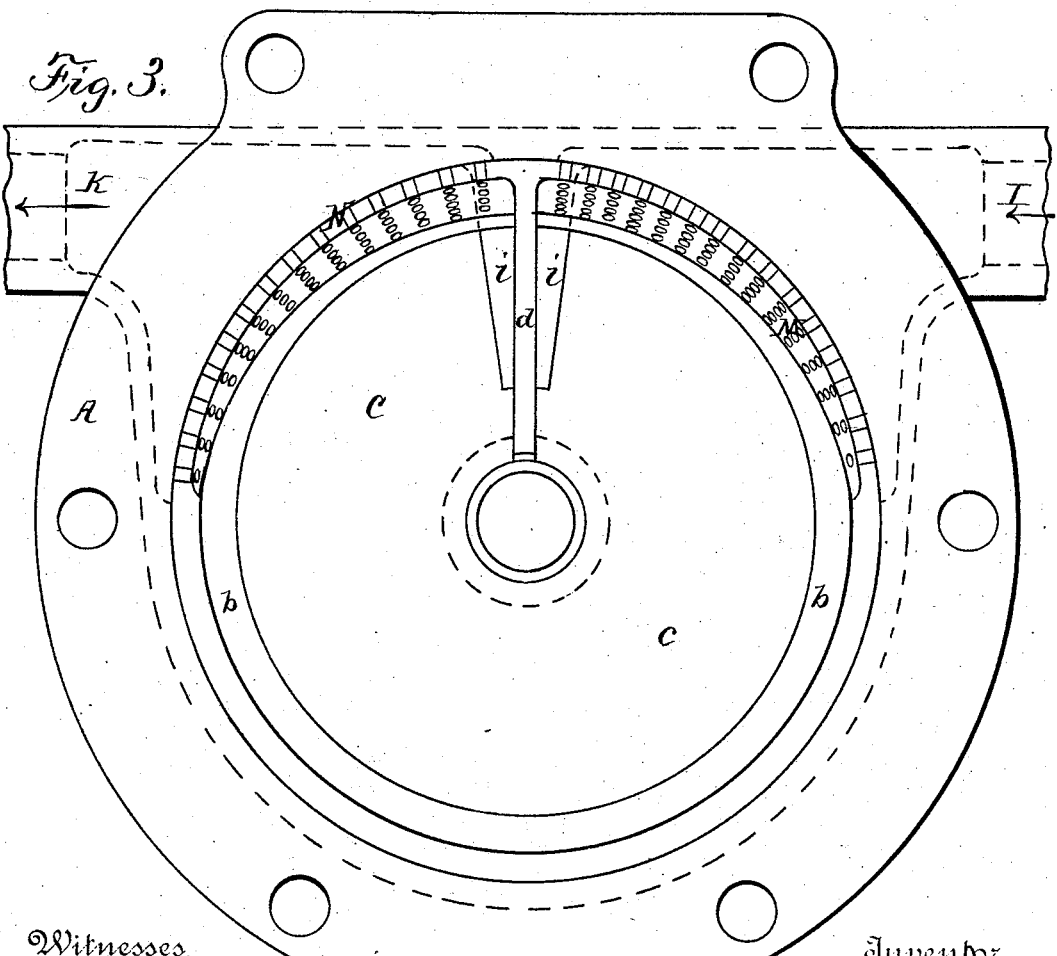
Figure 5:
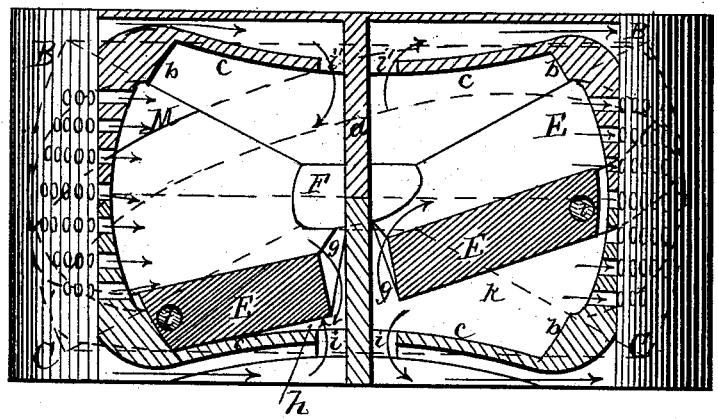
Figure 6:
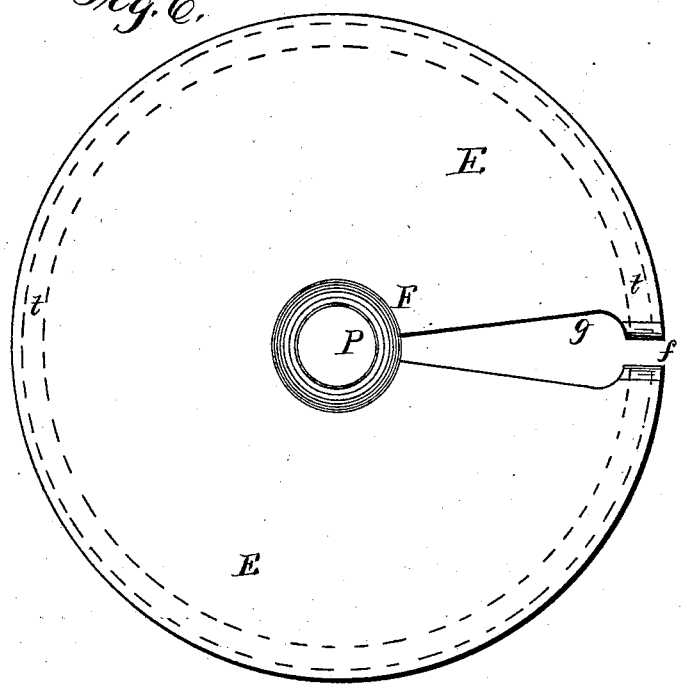
Figure 7:
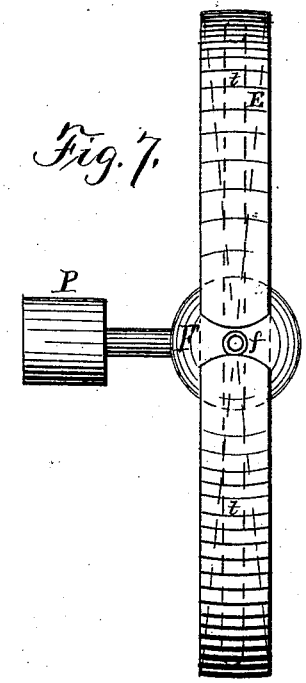
Figure 8:
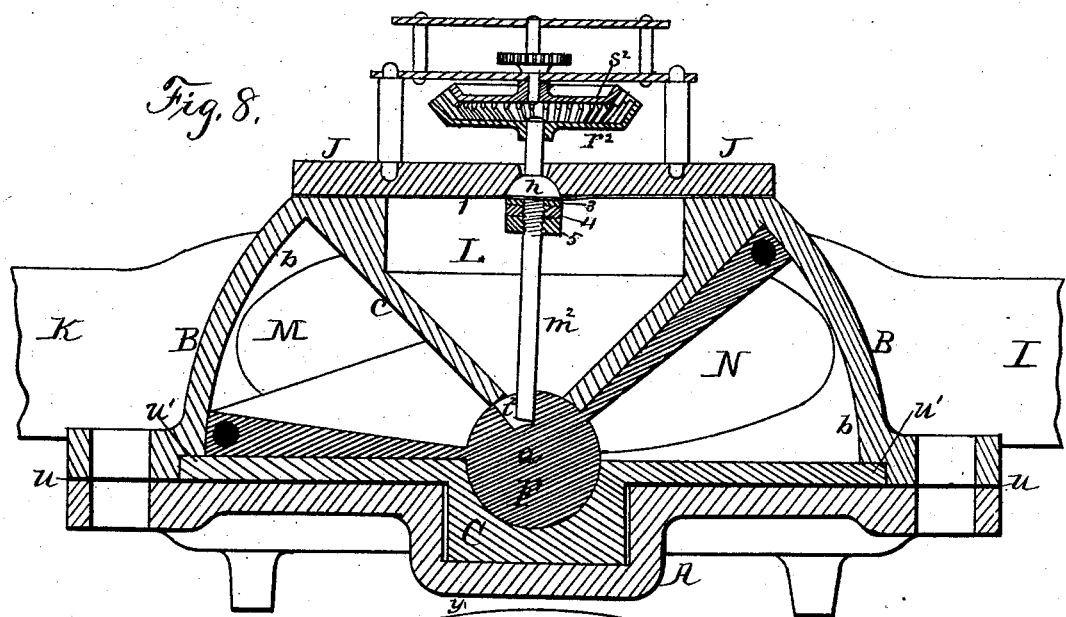
Figure 9:
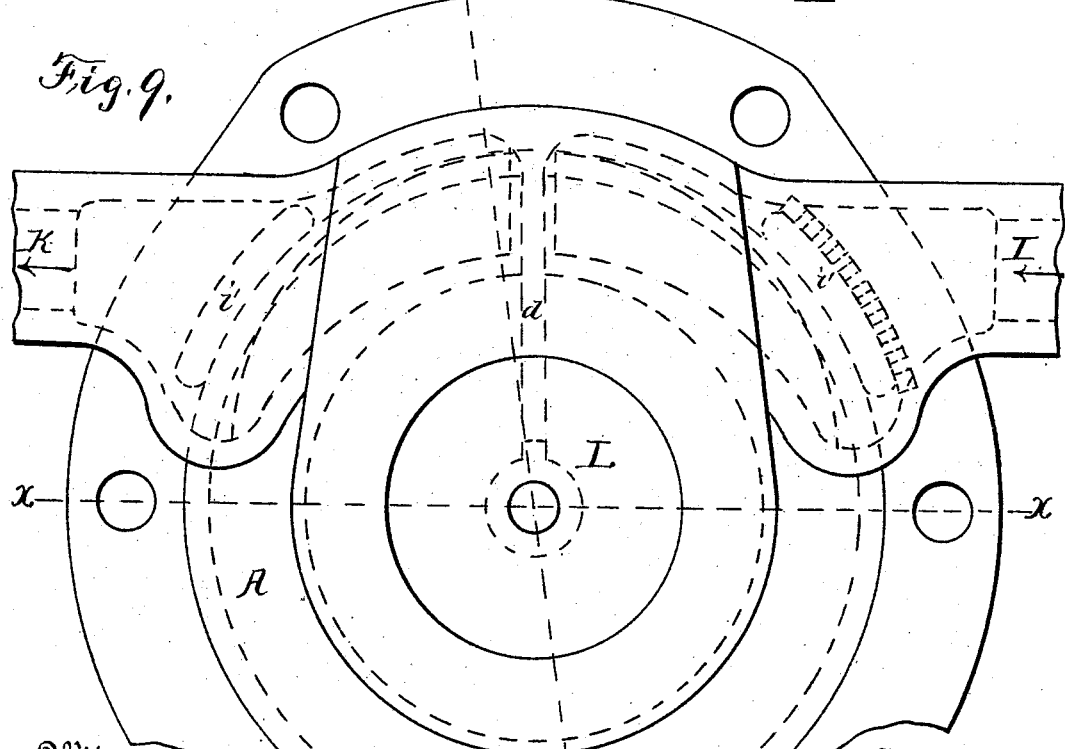
Figure 14:
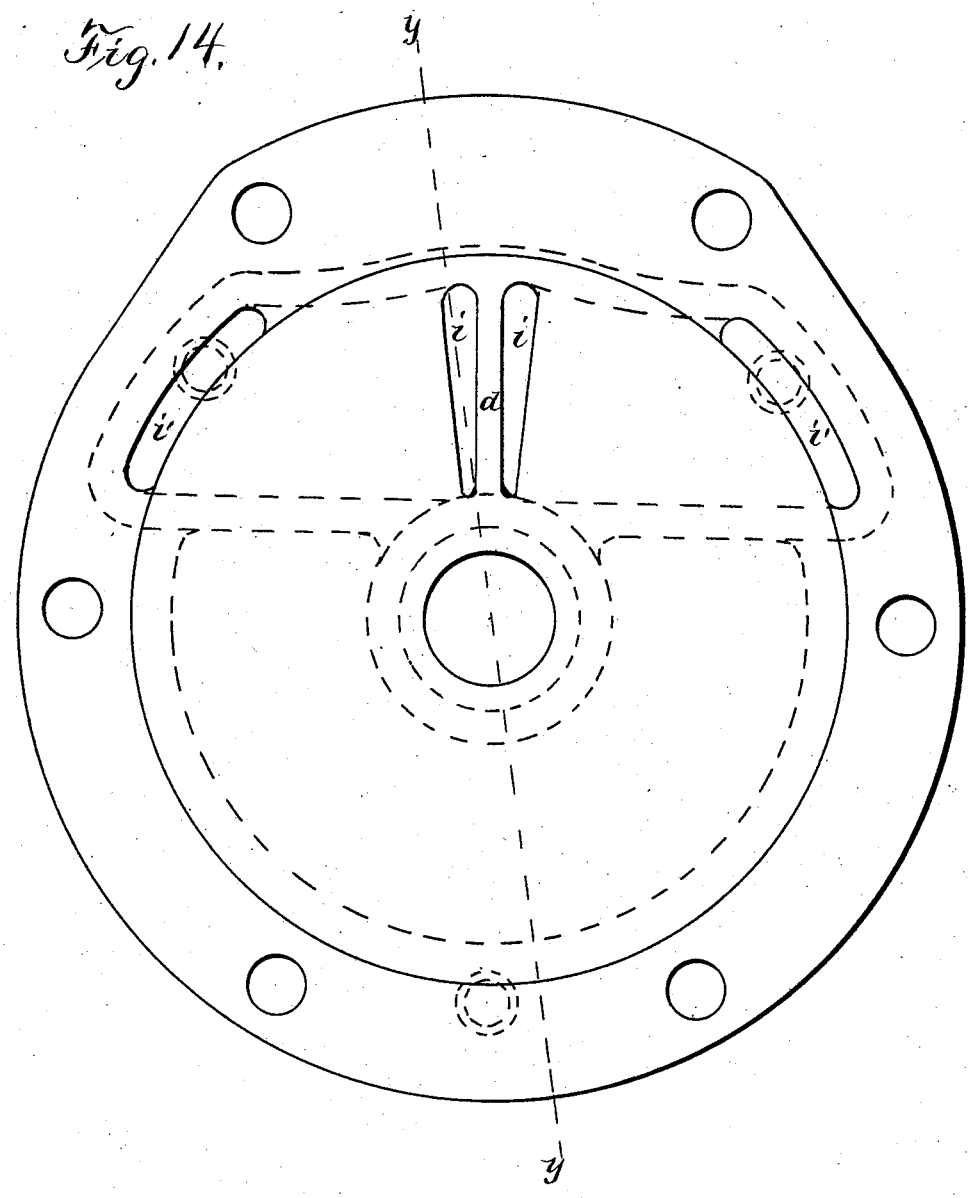
Figure 18:
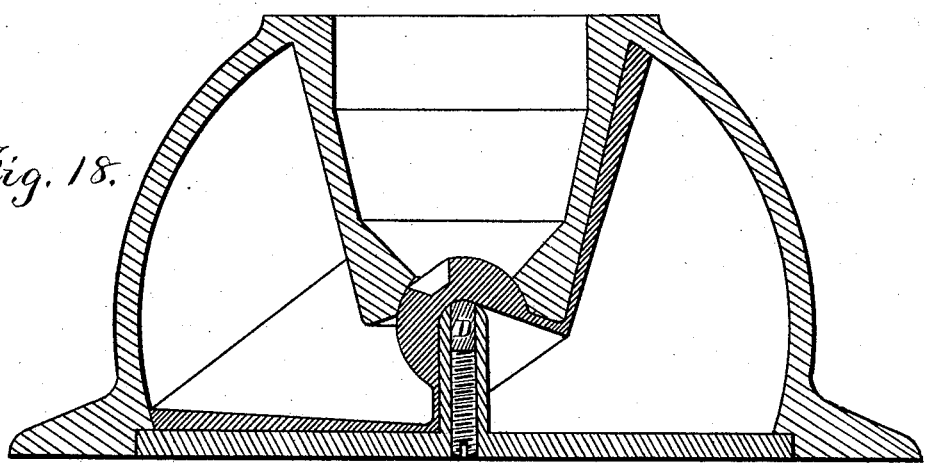
Figure 19:
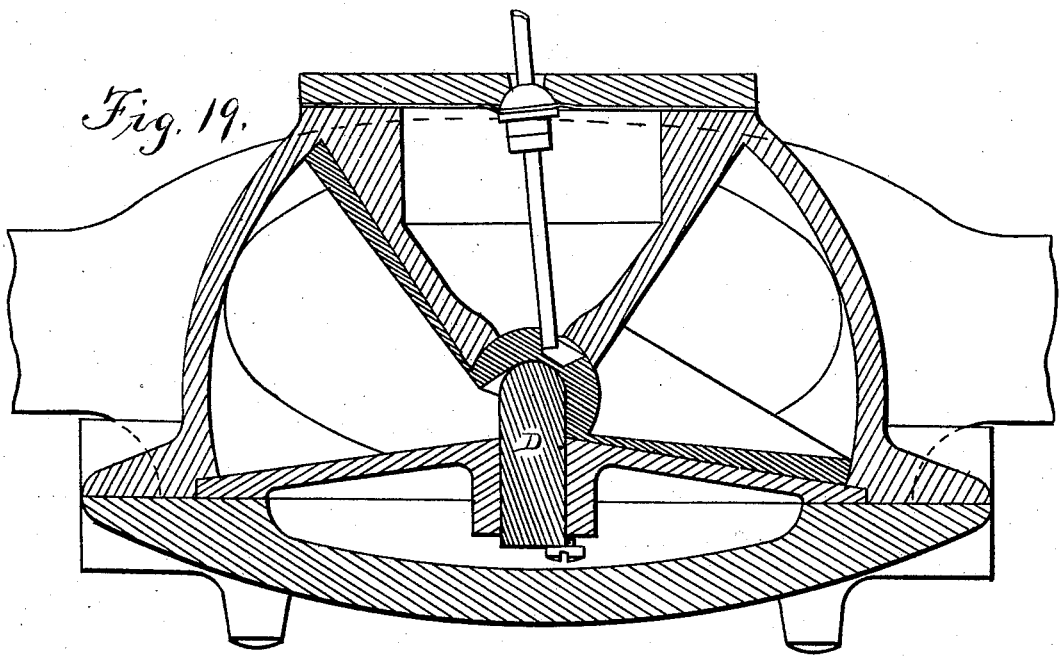

Referring to the drawings, Figure 1 represents a vertical section through a meter having my improvements on the line *x* of Fig. 2. Fig. 1ª is a detail showing means for driving the registering-train. Fig. 2 represents a top view, the cover or upper-case section being removed. Fig. 3 represents a top view of meter with upper case and part B removed. Fig. 4 represents a vertical section on the broken line *y* of Fig. 2, showing two positions of the piston in dotted lines. Fig. 5 represents a vertical section of the inner case of the meter on the line *z* of Fig. 2, showing the action of the ports. Fig. 6 is a plan, and Fig. 7 is a side elevation, of the piston. Fig. 8 represents a vertical section of another form of piston and case involving my improvements. Fig. 9 is a plan of the case shown in Fig. 8 with the upper plate or cover removed. Fig. 10 is a view of the under side of the measuring-chamber shown in Fig. 8. Fig. 11 is a section on the line y of Fig. 9. Fig. 12 is a plan, and Fig. 13 is a side view, of the form of piston shown in Fig. 8. Fig. 14 is a plan of the lower head-plate of the construction shown in Fig. 8. Fig. 15 represents in vertical section the sealing-joint of the register-connecting device shown in Fig. 8. Figs. 16 and 17 show in plan and section the lower case-head made in a single casting. Figs. 18 and 19 represent in vertical sections other forms of pistons and measuring-chambers also involving my present invention.

Referring to Figs. 1 to 7, the inclosing-case A is shown as having side inlet and outlet passage connections, I and K, which have ends suitable for making connections with the supply and service pipes, and these connections are preferably placed in line with each other. These inlet and outlet passages preferably increase in size from the connections until they enter the chamber of the case with large openings which lead to corresponding openings in the inside chamber, which latter may be composed of two interior case-sections, B and C, which form the measuring-chamber proper. A cover, J, incloses the whole and forms a chamber, L, in which is placed the register-connecting mechanism carried by said cover. The inner surfaces of the measuring-chamber are formed of a spherical surface, b, which is common to both sections B and C, which join each other at the equator of the sphere. Each section has a conical bottom, c, which terminates near its apex in a spherical recess concentric with the center of the spherical surface b. Where the two sections are joined, they inclose a chamber such as would be generated by a sector of a circle revolving about the center of the circle. This case chamber is divided by a radial abutment, d, which may be made of one or more separate pieces and secured in place; but I prefer to form each half of it in one piece with the section of the chamber which it divides when the said chamber is made of hard rubber. The inlet and escape ports enter the chamber on each side of the abutment, and will be more particularly hereinafter described.

The piston E is in the form of a disk or cone, having a central spherical bearing-hub, F, which fits into the corresponding recess of the case and makes a joint with the spherical surface thereof, while the sides of the piston make contact with the conical ends of the chamber. The piston has a radial slot, f, formed so as to fit freely over the abutment d, and this slot is enlarged within the circumference to form side passages, g g, so as to permit the water to flow from one side of the piston to the other in its operation, for a purpose which will be more perfectly described hereinafter. The piston has a weight, P, rising centrally from its bearing-hub, which acts by gravity and its centrifugal force to hold the piston in joint, forming contact with the case-walls, as will be hereinafter described.

It often happens that a meter is required to measure hot water or is placed in such a position that it is liable to extremes of heat and cold. In such cases it is necessary to make all the parts of a material not liable to injury from heat, as brass.

Referring to Figs. 8 to 11, the measuring-chamber is formed and constructed so as to be easy to turn in a lathe, and to this end the most difficult surfaces are all formed in one piece of the case, and they may therefore be accurately finished at one operation in the lathe. The measuring-chamber is formed of an upper section, B, and a lower section, C. The upper section contains the whole of the spherical surfaces b and a conical surface, c, while the lower section, C, is preferably a flat plate. Hence it is not necessary, as in Fig. 1, to accurately match two spherical surfaces together in separate sections, and this is of great advantage in practice. The plate C is re enforced by a plate, A, in order to make a packing-joint, the packing n being placed between the head A and under the case B and plate C, by which construction a metallic contact is made at n' between the two sections B and C of the measuring-chamber which will not be changed by the strain of the bolts in compressing the packing.

The plate J incloses an intermediate chamber, L, in which the register-connecting mechanism is placed.

The piston is of conical shape, having a ball-bearing, F, near its apex and a slot, f, which has the passages g g on each side, as before. The case is placed in a horizontal position and the piston, when in place, rests upon its ball-bearing with its open end above it, so that it naturally falls down by gravity into the position of Fig. 8, which is the position required by its joint-forming function.

*Poise of the piston.*—In water-meters of the class to which this device belongs, in which the piston moves in an orbit or progressive cycle of movements, the whole value of the instrument depends upon the piston's freedom of motion, and therefore the considerations of the poise and the relations of the bearing-surfaces of the piston become of the greatest importance in determining the value of the invention.

Referring to the figures, the piston E has a movement about the central point, a, of the spherical closure, and therefore the friction of the bearing-surfaces which are the nearest to the center of motion will have the least retarding effect upon the piston. I therefore provide a close fit of the ball-bearing F of the piston within its case-recess and make the disk-piston of smaller diameter than the spherical surfaces of the chamber, so that they do not come into contact at their circumference at e, but only approach close enough to prevent a free passage of the water. By this relation of the parts all friction is prevented at the circumference of the piston and the piston is supported upon its ball-bearing entirely, and in this condition it will move with scarcely perceptible resistance to the pressure of the water. In order still further to increase the sensitiveness in the movement of the piston, I prefer to form it of hard rubber, which has nearly the same specific gravity as water, and therefore the piston will nearly float in its chamber, and the ball-bearing, therefore, really only has to steady the piston in the center of its case-chamber.

When the piston is formed of hard rubber, I prefer to construct it with an interior strengthening-piece of metal, $t$, as shown in Figs. 6 and 7, so that it will be less liable to change its form or distort.

I prefer to place the meter with its measuring-chamber in a horizontal position, with its supply and discharge passages in line at either side of said chamber. The piston is supported upon an adjustable plug, D, preferably made of lignum-vitæ, placed under the ball-bearing F, and if there should be any wear it can be taken up by moving this plug upward in any suitable manner—as, for instance, driving it up with a hammer. In Figs. 18 and 19 devices for accomplishing this adjustment more accurately are shown. These figures also illustrate a novel bearing for the piston, consisting of a concave and convex bearing-surface opposed to corresponding convex and concave surfaces on the case or chamber, as clearly illustrated in the drawings.

*Power-transmitting register-connection.*—Having provided a free-moving piston, it is of importance to connect it with the dial mechanism of the meter through a connecting mechanism which will not retard or impede the movement of the piston. Since the dial is placed outside of the meter-case, it requires special mechanism in order to overcome the resistance arising in transmitting the motion of the piston through the walls of the case. I provide an intermediate chamber, L, in the inclosing-case of which is placed register-connecting mechanism constructed so as to reduce the rapid motion of the piston to a much slower movement. Any of the well-known mechanical powers—as levers or gears—may be used for this purpose; but I prefer to use a train of speed-reducing gearing, as shown in Fig. 1, in which the motion of the piston is transmitted through the arm $l$, shaft $m$, and the train of gears $n$ through the shafts and stuffing-box to the gear $r$, which drives the dial mechanism.

Another form of register-connecting mechanism is illustrated in Figs. 8 to 11. The ball-bearing has a hole, $l^2$, to receive the end of a lever which is seated in a socket in the upper plate, J, and the outer end of the lever carries a gear, $r^2$, which drives a differential gear, $s^2$, of the dial mechanism. The joint between the plate J and the lever-arm $m^2$ is secured by an arrangement shown in enlarged section in Fig. 15. A diaphragm, 1, of thin flexible material, is secured to the lever $m^2$ by a clamping device, which consists of a washer, 3, and two nuts, 4 and 5. The outer edge of the diaphragm is secured between the plate J and the case.

In order that the diaphragm shall offer the very smallest possible resistance, it is of great importance that it should be made very thin, and since a thin diaphragm is liable to be destroyed by the edges of the bearing $n$ of the lever I provide a supporting-piece, 2, preferably also of elastic material, which will prevent the thinner material from being bent with short bends over the corner of the said bearing, which would rapidly destroy a thin diaphragm.

While I may make the diaphragm of metal or gum-rubber, I have found that a very thin sheet of hard vulcanized rubber is the best material for use in a diaphragm, since it is very elastic and will stand the constant bending without injury and would not be corroded by impure water.

It is important to secure a perfect joint between the diaphragm and the lever-arm without injury to the former, and therefore I provide the loose collar 3, which bears uniformly upon the diaphragm. When the nut 4 is being screwed up, the washer 3 will not turn, and therefore will shield the thin diaphragm from abrasion of the nut. The lock-nut 5 is provided to prevent the nut 4 from becoming loosened.

*Supply passages and ports.*—In a water-meter in which the moving parts move rapidly it is not enough to design the meter according to the laws of statical pressure, because that is not the condition of its service, and the pressure due to the flow of the fluid is of the greatest importance.

It is upon the proper balance of the flowing current that the value of the device as a measuring-instrument depends—a point generally overlooked by designers. In this connection my invention is directed to such a construction and arrangement of the ports and connecting-passages as will conduct the water into the measuring spaces with a quiet and easy flow and to escape therefrom in the same manner, and also to provide such ample entrance-ports for the measuring-spaces at all positions of the piston as will give ample passage to the flowing currents without accelerating or retarding the flow, so that there shall be no strain upon the moving parts due to pressure from an insufficient passage for the water. It is not sufficient simply to provide large ports. They must also be placed in such relation to the measuring-spaces as to form a free channel of a size proportional to the flow into and from said space at all times.

In providing for a quiet flow of the current I make use of two features, which operate separately and conjointly in effecting the required result. First, the water is conveyed to the meter through a service-pipe of comparatively small sectional area, and through this it rushes with great force when the device is in full operation. In order to reduce the force of this current, I cause it to enter a flaring connecting-passage which enlarges in section from the point of inlet to the entrance into the measuring-chamber, so that as the water flows through this passage the velocity of the flow is gradually reduced until it enters the measuring-chamber without injurious force. The great advantage of this is best shown by a practical example, as follows: Suppose the water to be supplied to the meter through a pipe having about one-half-a-square-inch-section with a velocity of about sixty feet per second, which corresponds to about fifty-seven-feet head of water. Such a jet striking directly upon the piston would cause very serious pressures; but if this stream is caused to pass through a retarding-channel and to enter the chamber in a volume having a section of five square inches, or ten times the area, the velocity will be reduced to six feet per second, corresponding to only about fifty-six-one-hundredths-of-a-foot head. In other words, the meter would operate under this condition as if it were supplied by a two-and-one-half-inch pipe under one-quarter-pound pressure instead of by a three-fourths-inch pipe under twenty-seven-pounds pressure, and it is manifest that the piston would be subjected to much less injurious strains than with the small supply-passage.

In order to sufficiently retard the flow in a comparatively short passage, I may also use a screen or perforated device, which is placed in said enlarged passage, so as to break up all rapidly-flowing currents and to cause them to unite in a large flowing current after passing through it. To accomplish this I may make the screen of one piece with the inclosing-chamber, as in Fig. 1, by drilling a series of fine holes through the case at the ports, so as to form a screen, or I may use a separate inserted screen, as shown in Figs. 9 and 10. I prefer to make the outlet ports and passages upon the same principle; but the action of discharging currents is not as injurious as the action of the incoming currents. When the piston is passing over the portions of the cones near the radial abutment, it is of great importance that the water should have perfectly free access to the measuring-spaces, so that there shall be no retardation of the piston caused by suction. This matter is illustrated in Fig. 5, which shows the water entering between the lower side of the piston and the conical bearing-surface into the space $h$. For this purpose a port, $g$, in the piston-slot and a narrow port, $i$, (see Fig. 3,) in the cone $c$ are provided to give free access to the water, which now can enter from above and below into the space $h$, as shown by arrows. Similarly the water has a free escape from the chamber $k$ on the other side of the abutment, as shown by the arrows. The upper cone is also provided with ports $i'$, and they act in the same manner when the piston is in contact with the upper cone. The conduit-passages I K, Figs. 8 to 11, are cast with the upper case, B, and the passages connect with the inlet and discharge ports N and M in the spherical surface of the case, while branch passages $i''$ $i''$ connect through the lower head, A, with the ports $i$ $i$ on each side of the abutment $d$.

While I prefer to make the loose head in two parts, A and C, I may make it of a single casting, if desired. (See Figs. 16 and 17.)

Fig. 4 shows one of the ports in the spherical surface of the case, and in dotted lines the position of the piston just as the upper and lower chambers are changing from receiving to discharging spaces. In the position $I^2$ the piston is in the position when the upper chamber is changing from a filling to a discharging space and the upper edge of the piston has just closed the upper edge of the inlet-port M and is about to open the lower edge of the outlet-port N. While in the position $2'$ the piston is just closing the communication between the lower chamber and the inlet-port M and opening communication with the outlet-port N. The conformation of these ports is thus determined by these two positions of the piston, viz: The upper edges of the ports are located by the upper edge of the piston upon the spherical surface of the case, and the lower edges of the ports by the lower edge of the piston, an allowance or "lap," as it is technically called, being allowed to make sure that the ports do not communicate. These lines inclose the greatest space possible in which the ports can be placed, and, as shown in the figures, they occupy about one-fourth of the circumference of the case.

*Guiding the piston.*—My invention also includes provision for guiding the piston in its path, so as to maintain its joint-forming relation to the case-walls without connection to the case. This is the more readily accomplished because I have provided against the excessive action of the flowing currents upon the piston. Without such provision a positive connection, either rigid or yielding, would be desirable to prevent the piston from being the sport of the rushing water; but with the quiet flow into the measuring-chamber, effected as described, a free connection may conveniently be used for driving the registering device and the joint-forming function of the piston secured without destroying the balance and freedom of the moving piston. A piston so connected I call a "free piston." I provide a connection of the piston with the registering device, which is simply driven by the piston, but which does not limit the piston motion, as shown in Figs. 1 and $1^a$. It may consist of an arm, $l$, pivoted to a shaft, $m$, which bears against the projecting weight P, secured to the piston, so as to be driven before it by contact. In Fig. 8 such connection is shown as consisting of a free lever having one end freely entering in a hole in the piston ball-bearing and having a swinging joint-forming bearing upon the case, and the outer end of the lever drives the dial mechanism. With such a connection the piston can lift from its joint-forming surfaces and pass over any foreign substances that might come into the measuring-chamber without danger of choking or damage to itself, giving a chance for such matter to be washed out of the outlet-passages.

To maintain the piston in its proper joint-forming relation with the case-chamber, I place it in a horizontal position and so form it that its center of gravity is higher than the center about which it moves; hence the piston will be in a state of "unstable equilibrium" and will tend to fall down into its proper position when at rest, and when in motion the centrifugal force will also increase the tendency to keep it in place. This centrifugal force increases with the rapidity of the movement, and, since the disturbing action of the current increases also under the same conditions, the said force is well adapted to preserve the joint-forming action of the piston under varying conditions of use. If the meter were not placed in a horizontal position—that is, the piston supported on a bearing substantially or approximately vertical—and supported in a state of unstable equilibrium, a positive connection, either rigid or yielding, between the piston and registering mechanism or case would be necessary.

With the form of piston shown in Fig. 1 I use a weight, P, which is secured to the piston by a rod, P', above the latter. In the conical form of piston shown in Fig. 8 the piston is supported upon its apex, and its center of gravity is therefore higher than its center of motion.

The form of case required by pistons having the described motion is one which it is difficult to manufacture by ordinary methods, and therefore I have designed the meter so that it can be made of hard rubber or other similar material, which can be formed in a die with great accuracy.

Referring to Figs. 1 to 5, the measuring-chamber is formed of separate parts B and C, which have their inner surfaces accurately formed and contain the necessary ports for operating the piston. This inner part or measuring-chamber, which constitutes the meter proper, is inclosed within a strong case which has passages leading to the ports of the inner case, and which sustains the pressure of the water.

While the inner case may be made of metal, I prefer to make it in a die of hard rubber and to form the dividing-abutment $d$ in one piece with the portion of the case which it divides, as seen in the drawings.

In its operation the piston, in connection with the radial abutment, divides the case-chamber into four spaces, two of which are continually filling and two of which are continually discharging, the water entering through the ports upon one side of the abutment and filling the measuring-spaces until the piston closes communication with the inlet-ports and opens communication with the outlet-ports on the other side of the abutment, causing the chamber to discharge its contents. In this way the chambers above and below the piston are alternately filled and emptied during each movement of the piston recorded by the dial mechanism.

I do not herein claim the specific construction shown in Figs. 8 to 14, as such matter will form the subject of a separate application for a patent; but I do claim features of improvement hereinafter specified which apply to any form of meter having a piston operating as described.

From the above description and drawings it will be seen that the piston is not connected either with the case or the registering mechanism or with anything else by a positive mechanical connection, either rigid or yielding, but is operated and guided and controlled merely by the shape of the piston, the shape of the measuring-chamber, and the flow of water through the meter. This I call a "free piston."

It will be observed that I place my meter in a horizontal position, so that the piston has a motion of nutation around a vertical axis. I prefer to place it in this position, because the resistance due to the weight of the piston is then at all times constant. If it were placed in the vertical position, the weight of the piston would at one point of its revolution act with the force of the water to produce motion and at the opposite position against the force of the water to retard motion, and this would interfere with the accuracy of the meter upon light streams, irrespective of the means by which the piston is connected with or operates the dial mechanism.

Having thus described my invention, I claim, and desire to secure by Letters Patent, the following:

1. In a water-meter, a piston having a motion of nutation, combined with a measuring-chamber adapted to be divided by said piston into enlarging and contracting measuring-spaces, said piston being unrestrained by any positive mechanical connections, either rigid or yielding, and free to lift from its seat to pass over obstructions, substantially as described.

2. In a water-meter, a piston having a motion of nutation, provided with a radial slot, and combined with a measuring-chamber provided with a radial projection, said piston being unrestrained by any positive mechanical connections, either rigid or yielding, and free to lift from its seat to pass over obstructions, substantially as described.

3. The combination, in a water-meter, of a piston having a motion of nutation, substantially as described, with a measuring-chamber adapted to be divided by said piston into enlarging and contracting spaces, and having inlet ports and passages formed by a gradually-enlarging section at the entrance to the measuring-space, adapted to convey the water in a quiet flowing volume to the measuring-spaces, for the purposes specified.

4. The combination, with a piston having a motion of nutation, substantially as described, and a measuring-chamber divided by said piston into enlarging and contracting spaces and having suitable ports and passages for said spaces, of one or more screens placed in said passages, substantially as described, for the purpose specified.

5. The combination, in a water-meter, of a piston having a motion of nutation, substantially as described, with a case adapted to be divided thereby into enlarging and contracting spaces having ports for supplying said chambers formed of a series of small openings, for the purpose specified.

6. In a water-meter, a piston having a motion of nutation, substantially as described, combined with a measuring-chamber adapted to be divided by said piston into enlarging and contracting spaces, an inlet-passage gradually increasing in size from the service-pipe as it approaches said chamber, and a screen, substantially as set forth.

7. In a water-meter, a piston having a motion of nutation, combined with a measuring-chamber and a divided abutment, and having inlet and discharge ports formed in the spherical side walls extending on each side of said abutment, said ports having their upper and lower edges determined by the edge of the piston in its position of greatest elevation and depression, and said piston being unrestrained by any positive mechanical connections, either rigid or yielding, and free to lift from its seat to pass over obstructions, substantially as described.

8. In a water-meter, a piston having a motion of nutation and an inclosing-chamber, said piston being unrestrained by any positive mechanical connections, either rigid or yielding, and free to lift from its seat to pass over obstructions, combined with a registering device, substantially as described.

9. The combination, in a water-meter, of a case inclosing a measuring-chamber formed with spherical joint-forming surfaces and a spherical concentric bearing, and a piston unrestrained by any positive mechanical connections, either rigid or yielding, and free to lift from its seat to pass over obstructions, said piston operating in its case with a motion of nutation and formed with a central ball-bearing upon the case and having a projecting pin or stud in said bearing, with a registering device loosely connected thereto and driven by said pin, substantially as described.

10. The combination, in a water-meter, of a piston having a motion of nutation, substantially as described, and having a central ball-bearing and a stud in said ball, and a measuring-chamber divided by said piston into enlarging and contracting measuring-spaces, with a crank-shaft having its bearing in the case and driven by loose contact of the pin in the piston ball-bearing, whereby the crank places no restriction upon the movement of said piston, substantially as described.

11. In a water-meter, a piston having a motion of nutation, provided with a radial slot, combined with a measuring-chamber provided with a radial abutment and one or more ports in the ends of said chamber near said radial abutment, and also ports in said piston at the sides of said abutment, said piston being unrestrained by any positive mechanical connections, either rigid or yielding, and free to lift from its seat to pass over obstructions, substantially as described.

12. The combination, in a water-meter, of a piston having a motion of nutation, substantially as described, with a measuring-chamber having spherical side wall and an end conical surface and an abutment, forming a chamber of a form adapted to be divided by said piston into enlarging and contracting measuring-chambers, and having ports or passages formed both in the end cone and in the spherical side walls on each side of said abutment for supplying said measuring-spaces, substantially as described.

13. In a water-meter, a piston having a motion of nutation, combined with an inclosing measuring-chamber, said piston being unrestrained by any positive mechanical connections, either rigid or yielding, and free to lift from its seat to pass over obstructions, and supported at or near its axis in a state of stable equilibrium for the purpose of establishing and preserving joint-forming contact with its case, substantially as described.

14. The combination, in a water-meter, of a piston having a motion of nutation and a weight attached thereto above its center of gravity, adapted to act by its weight and centrifugal force to preserve the joint-forming function of the piston, with a measuring-chamber adapted to be divided by said piston into receiving and discharging spaces, said piston being unrestrained by any positive mechanical connections, either rigid or yielding, and free to lift from its seat to pass over obstructions, substantially as described.

15. In a water-meter, a piston formed of hard rubber and having a motion of nutation, substantially as described, combined with a skeleton of strengthening material—such as steel wire—substantially as set forth.

16. The combination, in a water-meter, of a piston having a motion of nutation, substantially as described, and registering mechanism driven by loose contact with said piston without mechanical connections, either rigid or yielding, with said registering mechanism.

17. In a water-meter, a piston formed of hard rubber, combined with a skeleton of strengthening material—such as metal—substantially as and for the purpose set forth.

18. In a water-meter, the combination of a hollow cone-shaped piston having a motion of nutation and an inclosing measuring-chamber, said piston being unrestrained by any positive mechanical connections, either rigid or yielding, and free to lift from its seat to pass over obstructions, substantially as described.

19. In a water-meter, a piston having a motion of nutation, combined with a driving-shaft of registering mechanism having a motion of nutation loosely connected to the hub of said piston, substantially as described.

20. The combination, in a water-meter, of a piston having a motion of nutation, substantially as described, and a measuring-chamber divided by said piston into enlarging and contracting measuring-spaces, with a crank-shaft driven by loose contact and without rigid or yielding mechanical connection with a projection from said piston, whereby said crank places no restriction upon the movements of said piston.

In testimony whereof I have hereunto set my hand in the presence of two subscribing witnesses.

LEWIS HALLOCK NASH.

Witnesses:
PERCY MacCALLUM,
WILLIAM C. WESTERVELT.